United States Patent
Harris et al.

(10) Patent No.: US 7,089,012 B2
(45) Date of Patent: Aug. 8, 2006

(54) METHOD AND SYSTEM FOR USE IN REDUCING COST ASSOCIATED WITH LOST CONNECTIONS IN WIRELESS COMMUNICATION

(75) Inventors: John M. Harris, Chicago, IL (US); Ronald T. Crocker, St. Charles, IL (US); Thomas B. Hart, West Dundee, IL (US)

(73) Assignee: Motorola, Inc., Schaumburg, IL (US)

( * ) Notice: Subject to any disclaimer, the term of this patent is extended or adjusted under 35 U.S.C. 154(b) by 92 days.

(21) Appl. No.: 10/902,363

(22) Filed: Jul. 29, 2004

(65) Prior Publication Data

US 2006/0025122 A1    Feb. 2, 2006

(51) Int. Cl.
*H04Q 7/20* (2006.01)
*H04Q 7/38* (2006.01)

(52) U.S. Cl. .................... 455/445; 455/403; 455/414.1; 455/414.4; 455/466; 455/426.1; 455/422.1; 455/500; 370/352; 370/353; 370/354; 370/355; 370/356; 370/357

(58) Field of Classification Search ................ 455/445, 455/403, 414.1, 426.1, 426.2, 518, 519, 500, 455/517, 412.1, 412.2, 422.1, 417, 466, 550.1, 455/552.1, 567, 414.4, 423, 425, 424, 67.11; 370/352, 353, 354, 355, 356, 357
See application file for complete search history.

(56) References Cited

U.S. PATENT DOCUMENTS

| | | | | |
|---|---|---|---|---|
| 6,246,872 | B1* | 6/2001 | Lee et al. ................ | 455/414.1 |
| 2003/0017836 | A1* | 1/2003 | Vishwanathan et al. .... | 455/517 |
| 2004/0192252 | A1* | 9/2004 | Aerrabotu et al. ........ | 455/404.1 |
| 2004/0235509 | A1* | 11/2004 | Burritt et al. .............. | 455/519 |
| 2004/0242211 | A1* | 12/2004 | Akhteruzzaman et al. .. | 455/415 |
| 2005/0215257 | A1* | 9/2005 | Lacroix et al. .......... | 455/452.1 |

OTHER PUBLICATIONS

*iDEN RF Interface: Layer 3 Procedures for Dispatch and Packet Data Operation*, more tham 1 year prior to Jul. 29, 2004.

* cited by examiner

*Primary Examiner*—Keith Ferguson

(57) ABSTRACT

The present embodiments provide apparatuses, methods and systems for use in notifying a remote communication device when a local wireless device loses its wireless link. In some embodiments, a method detects when a wireless connection is lost with a first communication device, identifies a second communication device that is communicating with the first device, and notifies the second device of the lost link. In some implementations, the notification of the lost link is supplied while the method provides batch communications. Some embodiments provide voice communications, where a remote device is notified when a local device loses its wireless connection. The second device can be determined by querying a server. The notifying can include forwarding an in-band tone, and/or generating a real time protocol packet. In some embodiments, the loss of the link is detected through a radio access network, a packet control function, and/or a mobile switching center.

13 Claims, 8 Drawing Sheets

METHOD AND SYSTEM FOR USE IN REDUCING COST ASSOCIATED WITH LOST CONNECTIONS IN WIRELESS COMMUNICATION

FIELD OF THE INVENTION

The present embodiments relate generally to mobile communication systems, and more particularly to mobile communication systems that monitor lost wireless connections.

BACKGROUND OF THE INVENTION

The use of wireless communication is growing exponentially. As a result, the amount of time an individual spends wirelessly communicating is also drastically increasing. Therefore, the costs associated with lost connections between parties are additionally increasing.

Parties using wireless communication sometimes lose their wireless connection. Other parties participating in the communication are often at least temporarily unaware of the lost connection. As a result, significant amounts of time are often wasted by users waiting for responses and/or trying to determine if another party to a communication has been lost. Users often may continue to talk or communicate information even though another party to the communication has been lost.

This wasted time can be very frustrating to users and can significantly degrade a user's experience.

BRIEF DESCRIPTION OF THE DRAWINGS

The above needs are at least partially met through provisions of methods, apparatuses, and/or systems for use in reducing the costs associated with lost wireless connections, as described in the following detailed description, particularly when studied in conjunction with the drawings, wherein.

Figure 1:
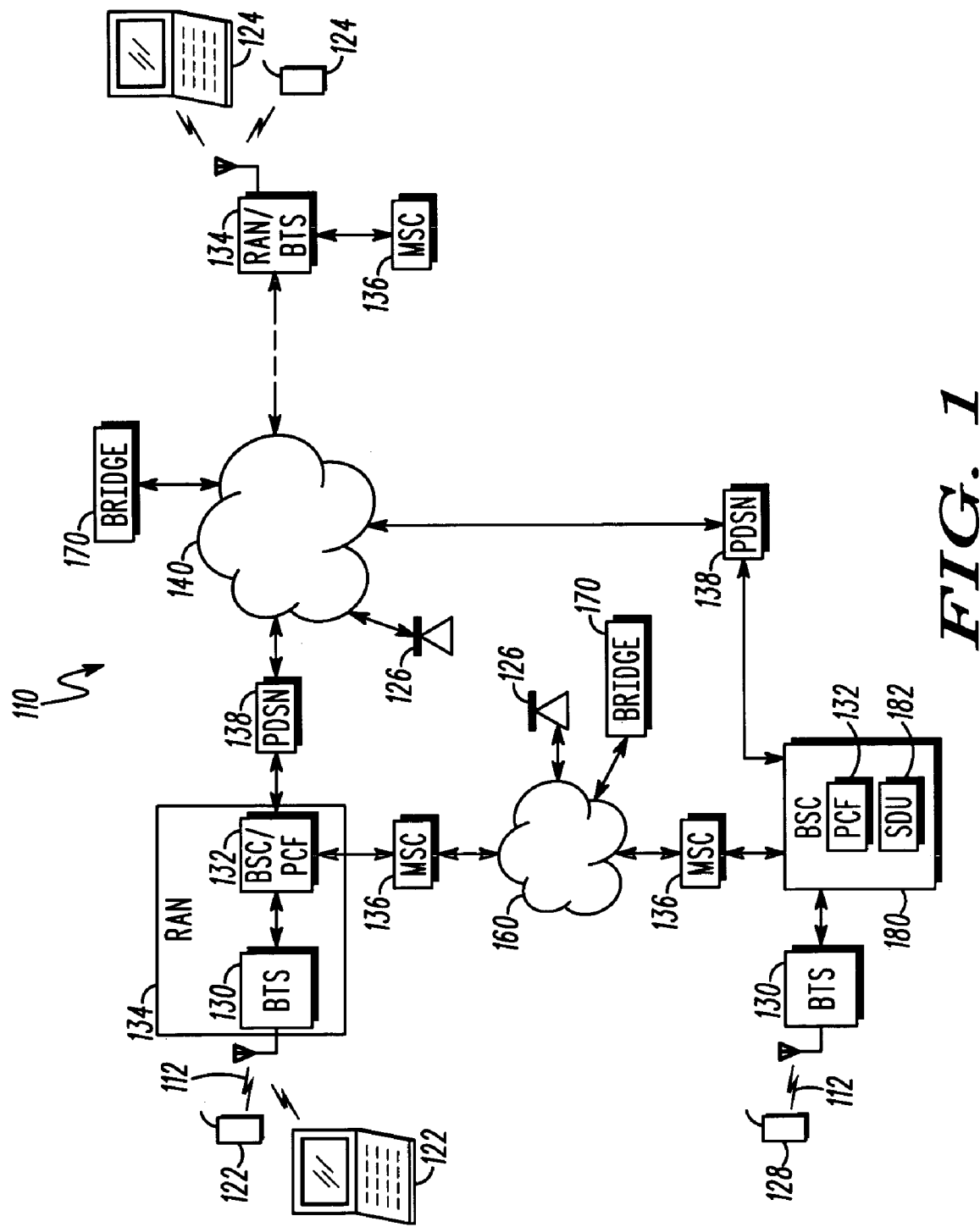
FIG. 1 depicts a simplified block diagram of a communication system or network according to some present embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present embodiments provide apparatuses, methods and systems for use in notifying a second, remote communication device when a first, local wireless communication device loses its wireless communication connection or link. Without this notification, the user of the second, remote communication device is unaware that the first communication device has lost its link, and the second user may unknowingly continue to try and communicate and/or wait for a reply for an extended period of time. This is a waste of the second user's time and can be very frustrating. Therefore, the present embodiments notify a remote user when a local user loses his/her wireless link. The quick notification provided by the present embodiments greatly improves users' experiences and increases users' satisfaction.

Some embodiments provide methods for use in providing wireless communication. These methods monitor local wireless communication connections and detect when a wireless communication connection is lost with a first communication device. A second communication device is determined with which the first communication device was communicating, and the method notifies the second communication device of the lost wireless connection. In some implementations, the second communication device is determined by querying a server for the second communication device. The method for notifying can, in some embodiments, include forwarding an in-band tone to the second communication device and/or generating and forwarding a real time protocol (RTP) packet. In some embodiments, the loss of the wireless link is detected through a radio access network (RAN), a packet control function (PCF), and/or a mobile switching center (MSC).

Some further embodiments provide a method for use in notifying a user of a loss of a wireless connection. These methods establish a communication connection between a first communication device and a second communication device over a communication network, where the first communication device wirelessly communicates with the second communication device over at least a first wireless link. When a loss of the first wireless link with the first communication device is detected, the methods notify the second communication device of the loss of the connection with the first communication device. The detection of the loss can comprise detecting the loss of the wireless link through a PCF, and the notification can comprise generating a notification from the PCF, and injecting the notification onto the communication connection directed to the second communication device. In some implementations, the PCF notifies a server of the detected loss of the wireless link with the first communication device, and receives an identification of the second communication device from the server such that the PCF accurately forwards the notification to the second communication device.

Systems for use in providing wireless communication are provided in some embodiments. These systems preferably comprise a base station that wirelessly communicates with a first communication device over a wireless link, a radio access network (RAN) coupled with the base station, and a second communication device communicationally coupled with the first communication device through at least the RAN. The RAN detects a loss of the wireless link and generates a notification and forwards the notification to the second communication device notifying the second communication device that the wireless link has been lost. In some implementations, the RAN comprises a PCF that detects the loss of the wireless link. The system can further include a packet data serving node (PDSN) coupled with the RAN and further coupled with a distributed network, such that the second communication device is communicationally coupled with the first communication device through at least the RAN, PDSN and the distributed network.

The operation of the present embodiments enhances user experience and significantly reduces wasted time when a first user is wirelessly communicating with a second user and the first user loses the wireless link. In existing communication networks, the loss of a first party on a wireless connection leaves a second party in limbo with the second party unaware that the first party has lost the wireless connection for some period of time. This is particularly relevant when the lost communication device is unable to signal a loss and/or drop from the communication link.

For example, if the first party is communicating over a wireless link to a second party communicating over a wireless or wired connection, and the first party loses the wireless link, the second party is unaware that the first party has lost the wireless link. Some wireless devices can signal the local user directly when the wireless device loses the connection, however, the other remote party or parties to the communication are unaware of the loss. The second or remote user is left unnotified and waiting for further communication. The second user may wait five, eight, ten seconds or more before realizing that the first party is no longer on the line. This is particularly apparent at the time the second party is talking or sending a communication when the first party loses the connection. The second party may continue to talk for several seconds (e.g., ten seconds or longer) before realizing that the first user is no longer present on the connection. This can be a significant waste of time, and is particularly frustrating. It is often difficult to determine what was communicated and what the first user did not receive.

The present embodiments advantageously address this lack of notification by signaling and/or notifying a user when another party to a communication loses or is dropped from a wireless connection. The loss can occur because of a lost wireless connection (e.g., a lost radio frequency (RF) connection interference, failed handoff due for example from resource unavailability, etc.), a loss due to a power failure (e.g., a mobile phone runs out of battery power), damage to a mobile device (e.g., a user drops his/her mobile phone), and other such occurrences where a connection is lost.

In some communication systems and/or networks, the systems distinguish between data communications versus voice communications, and/or dispatch communications versus telephony-styled communications. Typically, voice communications and/or services are real-time applications. Further, these systems attempt to provide equal service to all users, regardless of locations relative to transmission stations, such as base transceiver stations (BTS). Further, because voice communications typically do not communicate large amounts of data, communication systems typically allocate relatively low or modest data rates while still providing high-quality voice service.

Alternatively, systems providing dispatch or direct connect communications attempt to maximize the amount of data communicated through the system. Typically, users have different data rate requirements. In maximizing the data rates, systems attempt to allocate each user with the maximum data rate that the user can accept. This allocation is typically also limited by the communication channel, the interference on the channel, the amount of data bandwidth a user needs and other such conditions. Data or dispatch communications can also communicate voice data. For example, data communications include push-to-talk communications that are treated as data communications avoiding the need to dedicate communication links, voice over Internet, and other such communications. Employing data communications with some voice data allows the voice to be broken up and communicated over optimal routing and recombined to produce the output voice message. Further, data communications typically are implemented through shared resources, where packets can be communicated over a variety of different connections and recombined before final transmission to the intended recipient.

Because of the different structures and applications in communicating dispatch or direct connect communications versus voice communications, many of the present embodiments, in some implementations, distinguish between data communications and voice communications.

Generally, in implementing a dispatch communication, a first party knows a private identifier of a second party, and uses the identifier to make a dispatch call to the second party. Once the first party initiates a dispatch call, the communication system rapidly sets up the call, and sends a message to the first party's communication device. Upon receiving the message, the first party's radio generates an audible alert to let the first party know when to begin speaking and/or communicate data. In alternative embodiments, the speaker may be permitted to begin speaking prior to receiving this feedback. The second party's communication device receives the voice or data signal and plays or make the data available for the second party to receive, without the second party necessarily having to take any action.

The nature of dispatch communications, however, makes it very difficult for one party to determine if and when the party has lost his/her wireless connection. Because there can be long silences between a first party transmitting a communication and a second party replying to the first party, the first party is unaware for potentially long periods of time that the second user has lost the connection. Further, dispatch communications are typically implemented over half-duplex channels. As such, only one user communicates at a time, such that a speaking user is unaware that the other party to the communication has been lost from the connection. Therefore, the speaking user may continue to speak without knowing the other user is missing and may wait an excessive amount of time before determining that the other user is no longer on the connection.

The present embodiments provide methods and systems for identifying when one or more parties of a communication are dropped or lose their wireless connection. The methods and systems quickly notify the other party or parties of the communication that a user lost his/her connection. This saves the party that has not been dropped from waiting relatively long periods of time before determining that the other user is no longer on the line.

FIG. 1 depicts a simplified block diagram of a communication system or network 110 according to some present embodiments, where a first wireless device or mobile station 122 communicates over the network 110 through a dispatch communication (e.g., push-to-talk (PPT)) with a second wireless device 124 and/or wired device 126. The wireless devices can be substantially any wireless device capable of employing dispatch communications, such as wireless phones, pagers, personal digital assistants, desktop computers, laptop computers, and other such wireless communication devices. Often dispatch calls are mobile-to-mobile (M-M) communications, however, the present embodiments can be applied to mobile-to-wired or land calls (M-L) as well as land-to-mobile calls (L-M). Further, the present embodiments can be utilized with any relevant wireless communication techniques including, but not limited to code division multiple access (CDMA), CDMA2000, global system for mobile communications (GSM), general packet radio service (GPRS), universal mobile telecommunications systems (UMTS) (including third generation 3G UMTS), and other such wireless communication techniques.

The first wireless device 122 transmits and receives communications over a wireless link 112 with a base station, such as a base transceiver station (BTS) 130 and/or enhanced base transceiver system (EBTS). The BTS forwards and receives data to and from a packet control function (PCF) 132. The BTS 130 and/or PCF 132 are, in some embodiments, incorporated within a radio access network (RAN) 134. The RAN provides control and routing of communications to and from the wireless devices, e.g., wireless device 122.

The RAN 134 couples with a mobile switching center (MSC) 136. The MSC switches communications (e.g., telephone calls) within the system or network 110 and also to the public switched telephone network (PSTN) 160 allowing access to wired communication devices 126 and other network components. The MSC 136 interfaces with the RAN 134 to perform call setup and release, and various functions such as call processing and supplementary service related functions.

The PCF 132 of the RAN further couples with and forwards packets of data to a packet data serving node (PDSN) 138. The PDSN provides access and gateway functions between the wireless system and a public data network (PDN) 140, such as an intranet, the Internet and other such distributed networks 140, so that the first mobile communication device 122 can communicate voice and/or data content with other communication devices of the network (e.g., second mobile device 124 and/or wired device 126), to access data and/or content on the public data network, perform other activity such as email, and other similar functions and operations. In some implementations, the system includes and/or cooperates with conferencing devices, bridges and/or services 170. These conferencing bridges allow parties to establish conference calls by the users accessing the bridge 170. Typically, the users 122, 124, 126 access the conference bridge 170 through a distributed network 140 or 160.

In operation, the RAN 134 monitors the wireless link 112 to ensure accurate communication. For example, the RAN can direct the wireless device 122 to communicate with other BTSs, increase and/or decrease transmission power levels, and provide other control information with the wireless device. In some embodiments, the RAN can further detect a loss of the wireless device 122 and/or loss of the wireless link 112. Upon the detection of a loss of the wireless device 122, the RAN 134 notifies the PCF 132 to initiate a notification of other users and/or devices currently communicating with the first wireless device, as fully described below.

Still referring to FIG. 1, in some embodiments, the system or network 110 can additionally and/or alternatively provide communication paths through a base station controller (BSC) 180. A third wireless device or mobile station 128 can communicates with a second wireless device 124 and/or wired device 126 through the BSC 180. The third wireless device 128 transmits and receives communications over a wireless link 112 with a BTS 130. The BTS couples with the BSC 180. The BSC ensures packets are received and forwarded in order, essentially controlling the retransmission aspect of the wireless radio link 112 between the third wireless device 128 and the BTS 130. Further, the BSC 180 includes a PCF 132 and a selector distributor unit (SDU) 182. The SDU combines signals when a single wireless device 128 can be received by multiple BTSs. The PCF 132 additionally provides some buffering of packet data for the SDU 182.

The BSC 180 is typically coupled with an MSC 136. As described above, the MSC provides switching of calls over the (PSTN) 160 and/or other networks. The MSC 136 interfaces with the BSC 180 to perform call setup and release, and various functions such as call processing and supplementary service related functions. The BSC 180 can, in some implementations, further couple with and forwards packets of data to a PDSN 138 to establish communication over the network 140. The PCF 134 of the BSC monitors the wireless link with the third wireless device 128. In the event that the PCF detects a loss of the first wireless device, the PCF notifies other devices currently communicating with the first wireless device.

In some embodiments, the PDSN 138 adds addressing header information so that the packets can be transmitted over the network 140. If the target mobile communication device (e.g., second wireless device 124) is in a different region of the network 110, the PDSN can forward the data packets over the network to a second PDSN (not shown) to remove the header addressing information and forward the packets to the target wireless device 124.

The communication network 110 allows for data or dispatch communications between devices of the network. For example, the first wireless device 122 can communicate with the second wireless device 124 through push-to-talk (PTT) capabilities, Voice-over-IP capabilities and other batch and/or data path communications. Utilizing PTT, the system receives a request, for example, for the first wireless 122 to establish a data communication between the first and second wireless devices 122, 124. As discussed above, the first user, for example, identifies the second user and depresses a button on the first wireless device to activate or initiate communication. Upon establishing a connection with the second device, the system signals the first device (e.g., causing the first wireless device to generate an audible tone, generate a packet containing the audible coding of beep or other tone, generate a display, illuminate a light or other such signal) that the connection is established. The first and second users can then alternately verbally communicate with one another. Typically, only one communication device communicates at a given time, and communication between the two wireless devices is achieved by alternating the control of the connection between the two wireless devices. Further, the system typically provides a half duplex channel where communicating devices share the channel with one device controlling the channel at a time.

In some preferred embodiments, the RAN 134 and/or PCF 132 monitor the wireless link of the associated wireless device. For example, the RAN 134 or PCF 132 monitor the wireless link 112 with the first wireless device 122 and/or the PCF 132 monitors the link with the third wireless device 128. If the RAN 134 and/or PCF 132 detects that the link 112 is no longer active the PCF generates a notification that the first wireless device 122 (or third device 128) no longer has an active link. In some implementations, the PCF generates a notification that is forwarded to a second user currently communicating with the first user (e.g., user communicating through wireless device 124). The notification indicates that the first wireless device 122 lost the wireless connection 112. For example, the PCF 132 can generate and inject a brief real time protocol (RTP) packet into the communication with the second device. The real time protocol packet notifies the second user that the first user lost the wireless link 112. The notification can cause the second communication device 124 to generate an audible tone, to display a message, to illuminate or flash a light, can be a generated packet containing an audible coding of a tone, and/or other similar functions that notifies the second user of the lost link. In some embodiments, the PCF additionally and/or alternatively notifies a server 150 of the communication link loss. The server can then inject and/or fan out the notification to one or more users communicating with the lost wireless device, and/or other components of the system.

By having the RAN 134 and/or PCF 132 monitor the wireless link 112, the system 110 rapidly detects the loss. As a result, the second user is quickly notified that the first user lost the connection and the second user can take appropriate steps (e.g., try and reconnect, disconnect, and other similar functions), without having to wait extended periods of time trying to determine whether or not the first user is still connected.

Figure 2:
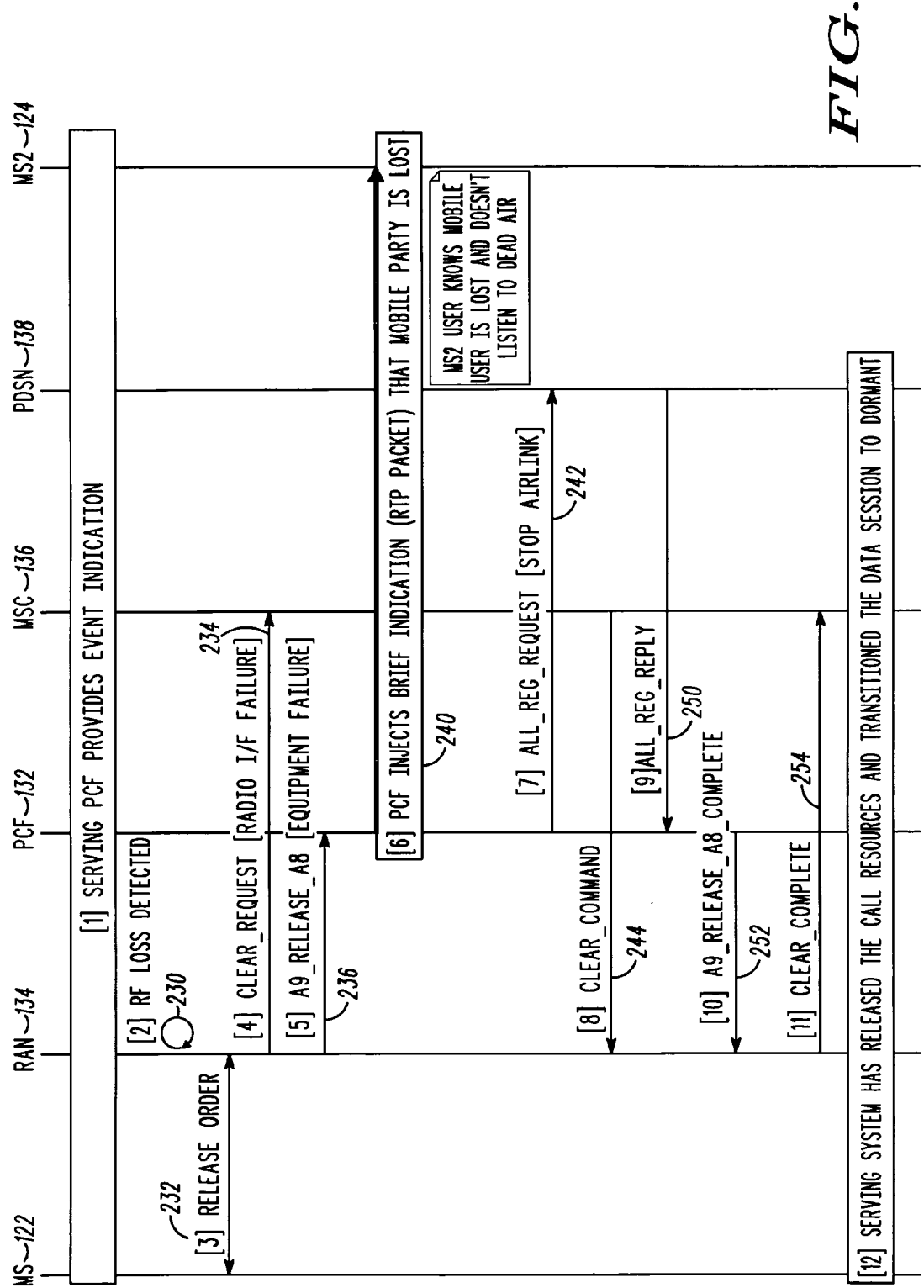
FIG. 2 depicts a simplified graphical representation of communication logic flow between components of the system of FIG. 1.

FIG. 2 depicts a simplified graphical representation of communication logic flow 210 between components of the system 110. Following the cooperating of the first and second communication devices, and once the initiating party (e.g., first mobile station (MS) 122) receives an indication that the target party (e.g., second mobile station (MS2) 124) is connected and available to receive audio data, the RAN 134 monitors the wireless link 112 in step 230. Once the RAN identifies a loss of the link, the RAN issues a release order in step 232 to the first MS 122.

A lost or dropped connection can be identified by numerous conditions, lack of signals and/or data, and other such information including, but not limited to, failing to receive good frames for a predefined period of time on a reverse link, failing to receive reverse dedicated pilot communications, power control bits, channel quality information, received signals with errors exceeding a threshold, receiving insufficient frames and/or bad frames for a period of time, if a signal or signals received from the wireless device are below a certain quality and/or below a certain quality for a predefined period, and other such indications and/or combinations of indications. Generally, if the system fails to receive information informing the system that the wireless device is active for a predefined and/or unreasonably long period of time, the RAN and/or PCF identify the link as an RF loss. RF loss can occur for several other reasons. For example, a disconnect may occur when a call or the resources being used is preempted or the call is dropped because of resource unavailability (typically these disconnects occur for lower priority calls), a call might also be dropped if one of the communication devices has a limited time of operation (e.g., a user is calling with a prepaid phone and the minutes run out), and other such disconnects.

In step 234, the RAN generates a clear request notifying the MSC 136 of the link failure. In step 236, the RAN generates an A9-Release-A8 message to the PCF 132 informing the PCF of the failure. In step 240, the PCF 132 generates and injects the loss notification to the second mobile station MS2, at which point the second user is aware of the link loss and no longer waits to determine if the first user is still on line. The notification can be generated through a number of different techniques. For example, the PCF can generate and inject an audio signal and/or message, such as an RTP packet to the other communication device (e.g., device 124 and/or 126), the PCF can generate a section initiation protocol (SIP) messaging, and/or the PCF can generate other similar notifications or combination of notifications as are known in the art.

In step 242, the PCF 132 sends an A11 registration request message with a stop airlink request to the PDSN 138, and request the session be shifted to dormant. The PDSN updates the system data accordingly. In step 244, the MSC 136 upon receipt of the clear request from the RAN 134 issues a clear command to the RAN. In step 250, the PDSN 138 replies to the registration request with an A11 registration reply message to the PCF 132. In step 252, the PCF in turn issues an A9-release-A8-complete acknowledgement to the RAN 134. In step 254, the RAN generates and forwards a clear complete acknowledgement to the MSC 136.

In the implementation of the logic flow 210 of FIG. 2, the second mobile station 124, and thus the second user, are notified relatively early in the process 210. This saves the second user a significant amount of time, reduces the second user's frustration, allows for the saving of network resources, and other benefits as described above and more fully below. Further, the present embodiments can be implemented without changes to standards and standard communications between system components. In some preferred embodiments, the equipment failure A9-Release-A8 signal is interpreted as the unexpected call loss, such that the PCF initiates the notification to the other user(s) of the lost connection.

Figure 3:
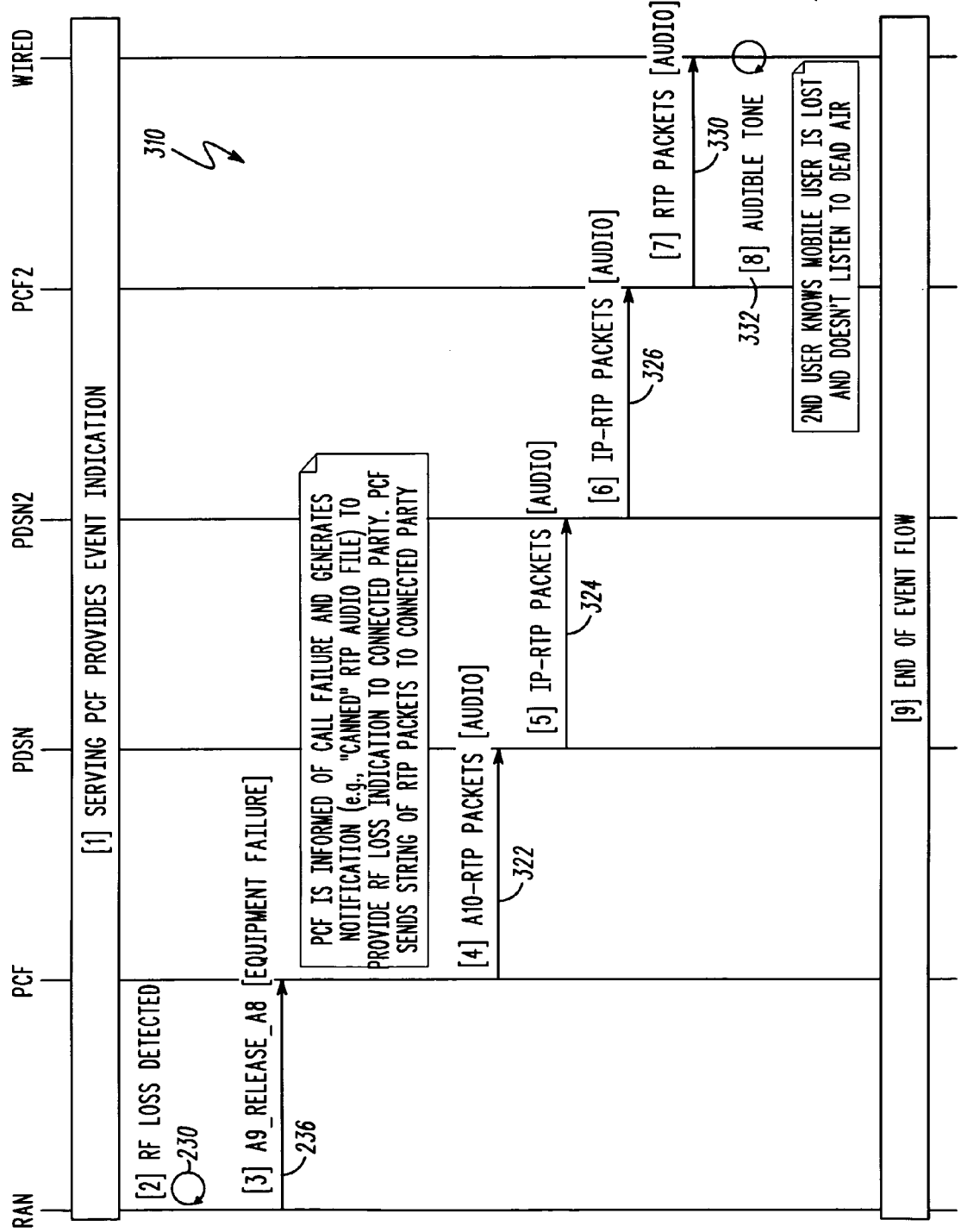
FIG. 3 depicts a more detailed graphical representation of communication logic flow according to some embodiments for a notification step in the process of FIG. 2.

FIG. 3 depicts a more detailed graphical representation of communication logic flow 310 according to some embodiments for the notification in step 240 of FIG. 2, where the PCF injects the notification to a remote user indicating the loss of the wireless link with the local user. The RAN detects the link loss with the local wireless communication device (e.g., device 122) in step 230 of FIG. 2, and generates an equipment failure notice to the PCF 132 (e.g., an A9-Release-A8 message) informing the PCF of the failure in step 236. Referring to FIG. 3, in step 322, the PCF generates a loss notification that is directed to the target, remote communication device (e.g., wired device 126), and forwards the notification to be delivered to the remote device. The notification can, as described above, be a tone, a text message, a command to cause the remote device to generate a tone or light up. In some embodiments, the PCF can utilize a prepared or predefined RTP audio file to provide the RF link loss indication to the remote device. The RTP packet or packets can be forwarded to the PDSN 138.

In step 324, the PDSN 138 receives the notification from the PCF, and formats and communicates the notification over the distributed network 140 to be received by a remote second PDSN 312. In step 326, the remote PDSN converts the formatted notification and forwards the notification as an A10 communication to a remote second PCF 314. In step 330, the remote PCF forwards the notification to the remote communication device 126. In step 332, the remote communication device notifies the second user, for example, by generating an audible tone as defined by the RTP packet(s).

In some implementations, the RAN 134 and/or the PCF 132 detects the loss of the wireless link 112 with the first communication device 122. Often, however, the PCF is unaware or does not know the identity of the second communication device or how to route the notification to the second communication device. In some implementations, the PCF attempts to determine or infer the remote user through the types of communication, addressing within the communications (e.g., IP addressing) and other such data. Additionally and/or alternatively in some embodiments, the PCF 132 upon detection of the lost link, communicates with a server 150 to identify the second communication device.

The server 150 can be identified according to types of communication, the lost user, addressing within the communications, look up tables, and other such information. In some embodiments, the PCF 132 and/or RAN 134 communicate with a specific designated server (e.g., a first network server because that is the server specified by a specific wireless communication carrier). In other embodiments, the PCF/RAN identifies the server based the type of communication, on the user lost, and/or addressing within the communications (e.g., IP addressing and/or other such addressing). For example, in some implementations the PCF/RAN (or other network component) can store users' IP addresses upon initiation of the communication connection. The stored IP addresses can be later used if the connection should be lost. The server can be located with the MSC 134, the PDSN 138, a separate server 150 coupled with the distributed networks 140, 160 and configured to communicate with the PDSN, MSC and/or PCF/RAN and provide call processing flows including distributing forward voice streams to the communication devices (e.g., one or more wireless devices employing PTT that can be accessed through different PCF/RANs), track user billing and other such services. The servers 150 can be operated by the system 110 provider, other companies provide wireless communication services (e.g., Nextel™, Sprint™, Verison™, ATT™ and other such wireless service providers), and the like.

Additionally and/or alternatively, some embodiments employ a conference bridge 170 to monitor the communication between parties of a communication. Multiple parties establish communication connections by accessing the conference bridge 170. The conference bridge can detect that one or more users have been lost. Once a loss is detected the bridge 170 can use that information to update the conference status, notify the server 150 and/or MSC 136, notify the other parties participating in the communication, and/or allow the server or MSC to generate the notification.

Still further, in some embodiments, the PCF, RAN and/or server can further verify that the first wireless device 122 was actually participating in communication with one or more other parties. Once verified, the PCF and/or RAN initiate the procedures to notify the one or more other parties that the first wireless device lost the wireless link 112. Additionally in some embodiments, the system further determines whether a loss was due to an intentional action, such as a user ended communication, or the network intentionally dropping the connection (e.g., aborting the call, selecting another operating mode, reconnecting to a cell not able to service the wireless device, preempted call, unavailable resources, prepaid minutes expire, and other such conditions) or the loss was unintentional.

Figure 4:
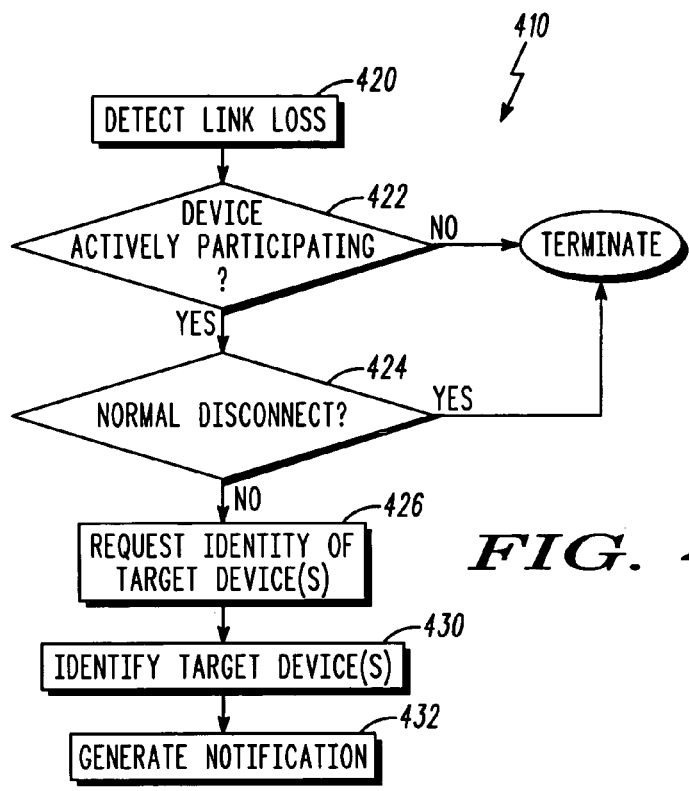
FIG. 4 depicts a simplified flow diagram of a process according to some embodiments where a radio frequency (RF) link loss is detected by a packet control function (PCF) and the PCF generates a notification.

FIG. 4 depicts a simplified flow diagram of a process 410 according to some embodiments where a radio frequency (RF) link loss is detected by a PCF and the PCF generates a notification. In step 420, the PCF detects the link loss. As described above, the PCF can directly detect the link loss and/or can be signaled by the RAN about the loss. In step 422, the PCF determines if the local communication device was actively participating in a communication (e.g., during a PTT either to or from the MS, or during a PTT "call"; if a PTT from either party occurred within the past THOLD seconds, where THOLD may equal, for example, six seconds). If the local device was not actively participating in a communication, the process 410 terminates. Alternatively, if the local device was participating in a communication, the process continues to step 424 where the PCF determines if the loss was due to an intentional or normal connection drop (e.g., call is aborted; another operating mode is selected; reconnecting to a cell not able to service the wireless device; and other such actions). If the loss is due to an intentional disconnect, the PCT prevents the notification to the remote device and terminates the process 410.

If it is determined in step 424 that the communication loss is not due to an expected normal disconnect, the process continues to step 426. Losses caused by unexpected disconnects can be caused by an number of effects and/or conditions such as the local device passes into a tunnel or other area that blocks wireless signals, power is lost to the device (e.g., battery is disconnected), the device is damages (e.g., user drops the device, or something lands or rolls over the device) and other such conditions. In step 426, the PCF communicates with a server 150 and/or a local MSC 136 to identify the one or more additional target communication devices actively participating in the communication with the lost local device. In step 430, the server or MSC identifies the one or more target devices. In step 432, the PCF generates a notification and communicates the notification to the one or more target devices. The notification can be substantially any relevant notification including, but not limited to, a session initiation protocol (SIP) message, one or more RTP packets, and other such notifications.

The present embodiment additionally allows for the notification of one or more users losing connections during a group call or conference call with more than two users. During group calls, the PCF 132 and/or RAN 134 systems associated with each party of the group call monitors the wireless link of their respective wireless devices participating in the group call. If a loss is detected, the associated PCF/RAN generates notifications and injects the notifications to one or more of the users participating in the communication. In some embodiments, the PCF/RAN notifies each of the other participants. For example, the PCF can query a server to identify each of the parties participating and obtain routing to each of the parties. The PCF can then generate the notification and inject the notification onto the in-band communication (e.g., a 250 ms tone).

In some preferred embodiments, the notification to the one or more parties is provided so that the notification does not interfere with or only minimally interferes with the group call. For example, the notification can be delivered as a text or display message such that the receiving communication devices display the notification. Additionally and/or alternatively the notification can cause the receiving communication devices to generate an audible tone. The tone, however, is typically low compared with a tone that would be sent to a single user so that the low tone is non-intrusive on the group call. In some alternative embodiments, the notification is only forwarded to the originator of the group call, or only the user currently having control over the group call is notified.

As is known in the art, typically in group calls using push-to-talk, a user currently speaking has exclusive rights or "control" of group communication. Some present embodiments additionally determine when a user is lost if the lost user is the speaking or controlling user. Once determined that the lost user was the controlling user, the PCF notifies the MSC that the lost user was the controlling user. The MSC releases the resources that were allocated to the lost user and further releases the exclusive control so that the lost user no longer "has the floor" of the group call and that the group communication is now an "open floor." For example, the MSC can issue a SIP message releasing control of the group call. This allows another user of the group to take "control" over the group, for example by selecting a push-to-talk button on the communication device.

Figure 5:
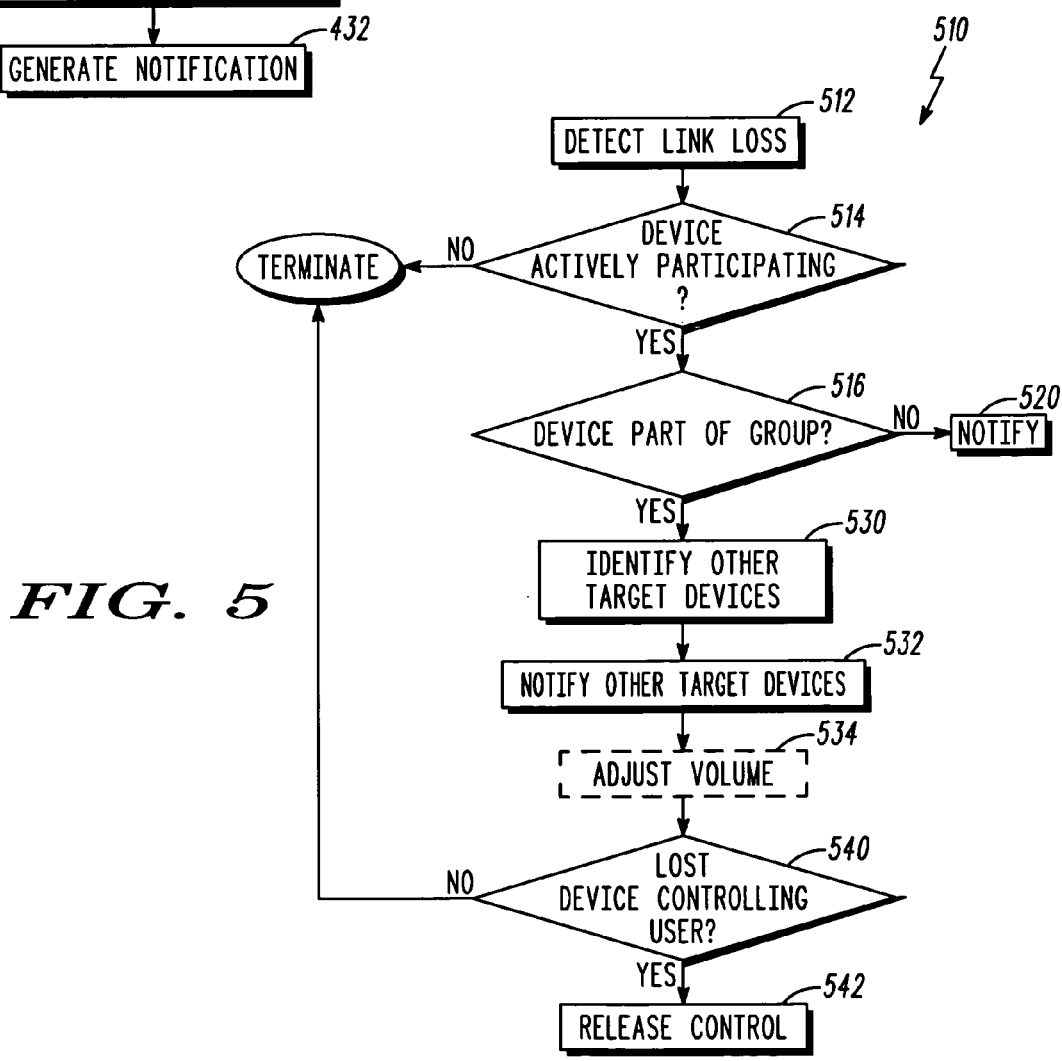
FIG. 5 depicts a simplified flow diagram of a process for detecting a loss of one or more parties to a group communication and the notifying one or more other parties participating in the group communication.

FIG. 5 depicts a simplified flow diagram of a process 510 for detecting a loss of one or more parties to a group communication and the notifying of one or more other parties participating in the group communication. In step 512, the process detects that a first user has been dropped from a wireless connection. This detection can be achieved through a PCF, RAN, and/or through an MSC as described above. Upon detection of a lost user, the process continues to step 514 where it is determined and/or verified that the first user was actively participating in communication over the system. If the first user is not confirmed, the process terminates and does not further notify any other users. Alternatively, if the first user is confirmed, step 516 is entered where it is determined if the first user is part of a group communication. If the first user is not part of a group communication, step 520 is entered where the other user of the communication is notified. In some embodiments, step 520 is implemented through a separate process, such as the process 210 as described above and depicted in FIG. 2.

If it is determined in step 516 that the first user was part of a group communication, step 530 is entered where the other users participating in the group communication are identified. In some embodiments, the PCF queries the MSC to identify the other users. In step 532, the PCF injects a notification to the other users. As discussed above, the notification can be implemented by an in-band communication and/or tone that is directed to each of the other participating users. For example, the PCF can send audio data, such as an RTP packet to the other users, and/or SIP messaging. In some embodiments, the process continues to step 534 where a number of other users participating in the group communication are determined, and the PCF adjusts a volume of the in-band communication according to the number of remaining users participating in the communication.

Still referring to FIG. 5, in step 540, the process determines if the lost first user was the controlling user. For example, the PCF queries the MSC to determine if the first user was actively identified as the speaking or controlling party. If it is determined that the first user was not controlling, the process 510 terminates. Alternatively, if it is determined that the first user was the controller part, step 542 is entered where the MSC releases the first user's control, for example, by issuing an SIP message releasing control of the group call.

The present embodiments can similarly be operated with desktop dispatch and/or data communications. The present embodiments are further capable of identifying a loss of the connection with the desktop, for example, desktops using a digital subscriber line for data communications. Upon the detection of the lost connection, the other one or more parties of the communication are notified of the loss such that the other one or more parties do not have to waste time trying to determine whether the desktop is still connected.

In the situation when a lost desktop participating in a wireless dispatch communication is the speaking or the controlling communication device, no end of the dispatch message is received from the desktop device. In some embodiments, the PCF 132 and/or RAN 134 monitor the wireless connection. If an end of a communication from the desktop is not received for a predefined or threshold period of time, the PCF and/or RAN determine that the desktop has lost the link and generate the notification to the other users as described above. Additionally and/or alternatively, the PCF and/or RAN can further monitor RTP/User Datagram Protocol (UDP) packets received from the desktop. If RTP/UDP packets are not received from the desktop for a threshold period of time, the PCF/RAN determines that the desktop is lost and generates the notification. The present embodiments for desktop communication can be employed with cellular networks, local area networks, satellite communication networks, combinations of these networks, and other such networks.

The loss of a wireless link 112 can be caused by numerous factors, such as, the wireless device 122 losing power (e.g., battery being disengages and/or going dead), the link being released for cause (e.g., aborted call, selection of another operating mode, termination due to fne, reconnecting to a cell not able to serve the wireless device), and other such causes for release. In these instances, the present embodiments generate similar notifications as described above to the other one or more users communicating with a wireless device that is released or disconnected from a link due to power loss and other abnormal link release. In some instances, the wireless device detects that the abnormal link release is going to occur and notifies the system allowing the system to generate the notification to the other user(s) currently communicating with the wireless device being lost. The notification can be an audio notification, a text notification, a command to trigger the communication device to generate a notification (audible tone, flash a light), and other notification. In some implementations the audio notification can be a voiced announcement, for example, a voiced message stating "lost call," "dropped call," or other such announcements. The notification can further distinguish between a link loss and a loss due to battery failure or other causes. For example, a tone or low beep can be generated to indicate the lost call is due to a battery failure, while a short audible announcement stating "lost call" can identify a loss due to a lost communication link.

Some embodiments generate a notification to a server (e.g., server 150) when a link loss is detected. The server utilizes the notification to determine one or more other users participating in a communication with the lost device. The server then can generate a notification of the loss and fan the notification to all interested parties. Additionally and/or alternatively, upon receiving a notification of a dropped user (e.g., notification from a PCF), the communication device (e.g., wireless device 124) can query the server to identify which party or parties were dropped and/or lost.

The present embodiments provide notifications to users communicating through short message services (text and/or typed messages). Short messaging services allow messages to be forwarded from a first user to a second user, and the second user can type in and forward a follow-up reply. These text communications can continue through an unlimited number of communications between the users. In some embodiments, the text messaging is communicated across one or more traffic channels. In utilizing traffic channel based text messaging, the present embodiments detect when one of the users loses the link. Upon the detection of the lost link, the system interjects a notice (e.g., a tone) and/or a text message to the remaining user(s). The text message or other notification can be generated by the PCF or other system component as described above.

Further, the present embodiments advantageously improve the average user's experience and/or increases network capacity. Users expect a certain level of quality of service from the wireless network provided, which can be generally equated to the user experience. If the service is poor, inconsistent and/or painful for the user (e.g., high percentage of lost calls), the user's experience is lower, and his/or frustration level with the system increases. Many systems attempt to achieve a defined fixed sensitivity to achieve a desired user experience. For example, some systems tolerate a fixed percentage (e.g., 1%, 2% or some other percentage) of lost connections.

The present embodiments reduce a users' frustration level by quickly notifying the user of the lost connection, avoiding long periods of uncertainty of whether the other user is still on the line, and making link outages less painful. The quick notification greatly improves users' experiences and increases users' satisfaction.

Additionally, users are also likely to remain satisfied, at least at pervious satisfaction levels, with an increased percentage of lost calls because the present embodiment notifies the users of the lost connections. This allows the same system to be operated at a higher capacity. Operating a higher capacity may result in an increased number of lost connections and/or calls, but users are more tolerant to losing connections because they are quickly notified. Therefore, the system can increase capacity without decreasing user satisfaction.

For example, some systems can increase their tolerated fixed percentage of lost connections by 1%, 3% or more while still at least maintaining the same user experience. Some systems may carry, for example, 1.25 times more load when users tolerate an increase in lost connections from 1% to 5%. In some embodiments, simulations are employed to estimate the increased percentage of lost connections that will be tolerated while providing the same user experience. These simulations estimate an increased percentage of lost connections based on a percentage increase in system capacity. For example, if a system capacity is increased by 10%, the simulation may define the RF loss probability to be increased by about 2–3%. Because the present embodiments provide notification, users may tolerate an increase of 3% of lost connections. Therefore, in one sense of the word capacity, the simulation defines the increased capacity of about 10%. The ratios between the RF loss probability and increased capacity depends on the system, the components of the system, the amount of interference in the area covered and other such factors. The simulation, however, attempts to take these parameters into consideration and provide accurate estimations of capacity loads.

The present embodiments improve user experience with the same system capacity and/or an increase in system capacity. Additionally and/or alternative, the present embodiments resulting in users tolerating increased numbers of lost connections allowing the system to increase system capacity (e.g., system can carry ~1.25× more load, when users tolerate 5% lost connections instead of 1%).

The present embodiments can, in some embodiments, further release network resources upon the detection of a lost communication link. The RAN and/or PCF can forward the notification to the remote user, and further notify the MSC, the server and/or other system controllers and components. The MSC and/or server can initiate the release of network resources. Due to the notification to the MSC and/or other components of the system, the resources can, in some implementations, be freed up sooner than would have otherwise been freed up. The freed up system resources can then be utilized with other communications. Further, previous systems typically continued to upload a users data (e.g., audio) for the user that were not dropped. This uploaded data is typically just dumped, particularly when the data is not buffered (e.g., instantaneously transmitted).

Some present embodiments alternatively buffer or store communicated data (whether voice or data). The amount of data stored can be defined by any number of parameters, but not limited to, a period of time, when a user stops talking, until a confirmation or receipt is received from a second user, and other such parameters. In the event a first user is speaking and the other user of the communication is lost, the first user may continue to speak until and/or after the notification is received. The buffering can similarly save some or all of this communication data. In some embodiments, the system can forward this stored data to the second user at a later time, and/or over a different radio frequency technology or other communication medium (e.g., voice mail, send as email with audio attachment; or through alternative means).

Still further, when a first user who is speaking loses the connection, the buffered data can be saved. This saved data can be later retrieved by the lost user, and/or other users, so that the user(s) can identify when during a conversation a loss occurred and what information was and was not communicated.

The present embodiments provide notification for lost connections for other types of communication besides batch or data communications. For example, some embodiments additionally and/or alternatively provide notification of a lost party during wireless interconnect or standard two-way voice communications. Some voice interconnect paths allow data to also be communicated, but primarily, voice paths provide voice communications between two or more users, such as cellular communications and the like.

As described above, some wireless devices can detect their own loss of a connection. These wireless devices can then notify the local user of the loss. For example, a first wireless device can wirelessly communicate with a second wireless communication device. If the first wireless device detects a loss of the communication link (e.g., RF link) with the base station, the first wireless device can generate a beep indicating to the local owner of the first wireless device that the wireless link was lost. The first wireless devices and the wireless communication system are, however, incapable of notifying or initiating a notification to the second wireless device participating in the communication.

The second user is unaware of the loss. As such, the second user typically continues with the conversation and/or waits for further comments from the first user. Because the second user does not know why the first user is not speaking, the second user may wait extended amounts of time before deciding that the first user is no longer on the connection. Further, the second user does not know why the first user is disconnected. This waiting can be a significant waste of time, and is particularly frustrating. Further, the resources to maintain the connection of the second user is wasted valuable resources that could be utilized with other users. The ambiguity of a lost connection can be particularly evident when the user of the wireless device that is lost is using a speaker phone.

The present embodiments detect the link loss with a first wireless communication device and provide notification to one or more other communication devices that the first wireless device lost the wireless link. This notification significantly reduces and/or avoids the other user(s) wasting time waiting for the first user. Further, some embodiment release communication system resources once the notification has been forward to the other user(s), freeing up the resources for other communications. Additionally, one or more of the other communication devices can be shut down and/or instructed to enter into a semi-dormant or RSCI state to conserver power.

Figure 6:
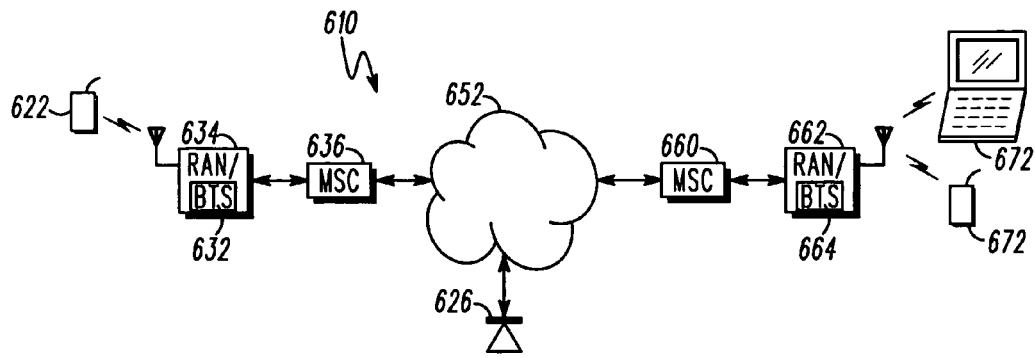
FIG. 6 depicts a simplified block diagram of a communication system or network providing voice communication over a voice path.

FIG. 6 depicts a simplified block diagram of a communication system or network 610 providing voice communication over a voice path. A first wireless device 622 wirelessly communications over a wireless link 612 with a first base station or BTS 630 of a first RAN 634. The first RAN further couples with a first MSC 636.

The first MSC 636 established communication channels, typically over a PSTN 652, with one or more wireless devices 672 and/or other wired devices 626. For example, the first MSC can couple with a second MSC 660 through the PSTN 652. The second MSC 660 couples with a second RAN 662 that includes a second BTS 664. The BTS 664 wireless communicates over a second wireless link 670 with a second wireless device 672.

Figure 7:
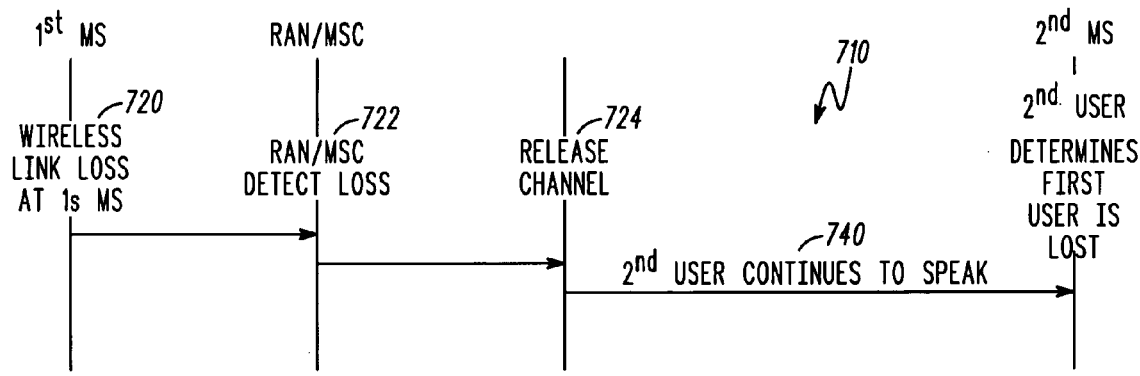
FIG. 7 depicts a simplified graphical representation of time-line logic flow of the signaling between components of the communication system according to voice communication systems without the implementation of the present embodiments.

FIG. 7 depicts a simplified graphical representation of time-line logic flow 710 of the signaling between components of the communication system according to voice communication systems without the implementation of the present embodiments. Initially at step 720 a wireless communication link is lost and/or dropped between a first wireless device 622, such as a first MS, and a transmitter, such as a BTS 630. The local RAN 634 or local the MSC 636 associated with the communication link 612 to the first MS 622 detects the loss at step 722. The MSC instructs, at step 724, the release of the communication path and/or channel to the second communication device 672, such as a second MS. The second MS is not notified and is unaware of the loss of connection with the first MS for an extended period of time 740. This is wasted time for the second user.

Figure 8:
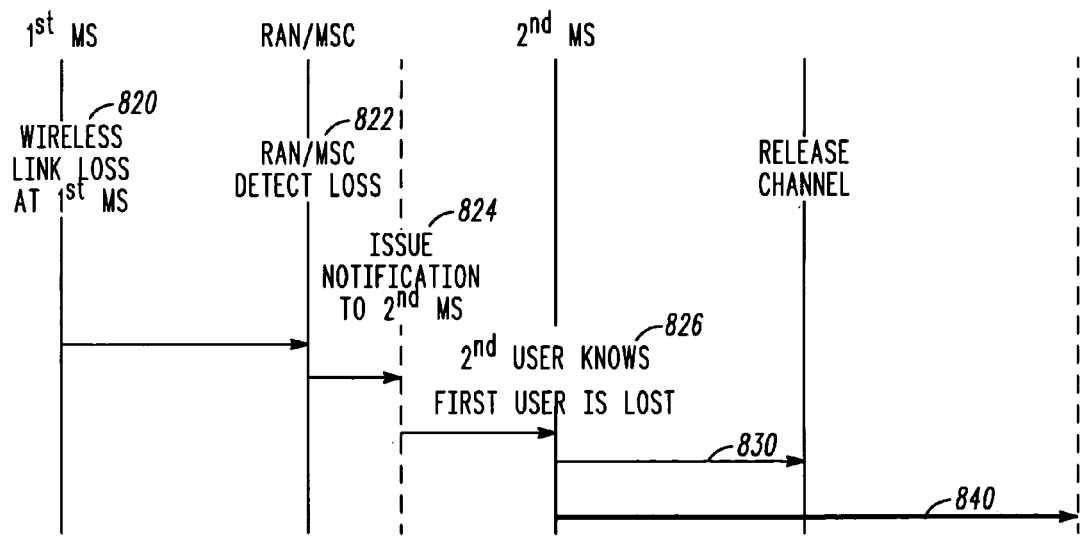
FIG. 8 depicts a simplified graphical representation of time-line logic flow of the signaling between components of the communication system providing notification of lost wireless links according to the present embodiments.

FIG. 8 depicts a simplified graphical representation of time-line logic flow 810 of the signaling between components of the communication system, such as system 610 providing voice communication paths, that implements notification of lost wireless links according to the present embodiments. At step 820, a wireless communication link is lost and/or dropped between a first MS 622 and a BTS 630. The local RAN 634 or local MSC 636 associated with the communication link 612 to the first MS 622 detects the loss at step 822. The MSC or RAN generates and injects a notification to the second MS 672 of the lost link at step 824. At step 826 the second user receives the notification. The notification can be a tone or other audio notification forwarded to the second MS, a command to cause the second MS to generate a tone, or other such notification. Following the injection of the notification, the MSC issues commands at step 830 to release of the communication path and/or channel to the second MS. Because of the early notification, a significant amount of the second user's time 840 is saved. For example, without the notification the user is unaware of the lost connection and may stay on and/or continue talking on the line for 5–10 or more seconds. Alternatively, some embodiments generate the notification to the remaining one or more users of the loss in less than a second. This saves the users significant amounts of time and frustration.

In the present embodiments, typically the RAN 634 and/or a PCF detect the loss of the wireless link with the wireless communication device (e.g., communication device 622). The RAN notifies the MSC 636 of the lost link. In some embodiments, the RAN generates and injects the notification to the second communication device (e.g., communication device 672). The MSC releases the communication channel with the second communication device after the RAN has forwarded the notification. In some implementations, the RAN notifies the MSC of the lost link after the RAN has forwarded the notification. As an example, the MSC can typically implement a trunk release in about 1.5 seconds. The notification can typically be generated and forwarded (by the RAN or MSC) in about 0.2 seconds. As such, the notification is received at the second device about 1.3 second before the communication trunk is released. Therefore, the present embodiments can save users at least about 1.3 seconds in instances when a user might notice the release of the communication channel, and typically can save users significantly longer amounts of time (e.g., in excess of 5 seconds in some instances) because users typically are unable to detect the channel has been released and they may continue to talk to the dead line.

Figure 9:
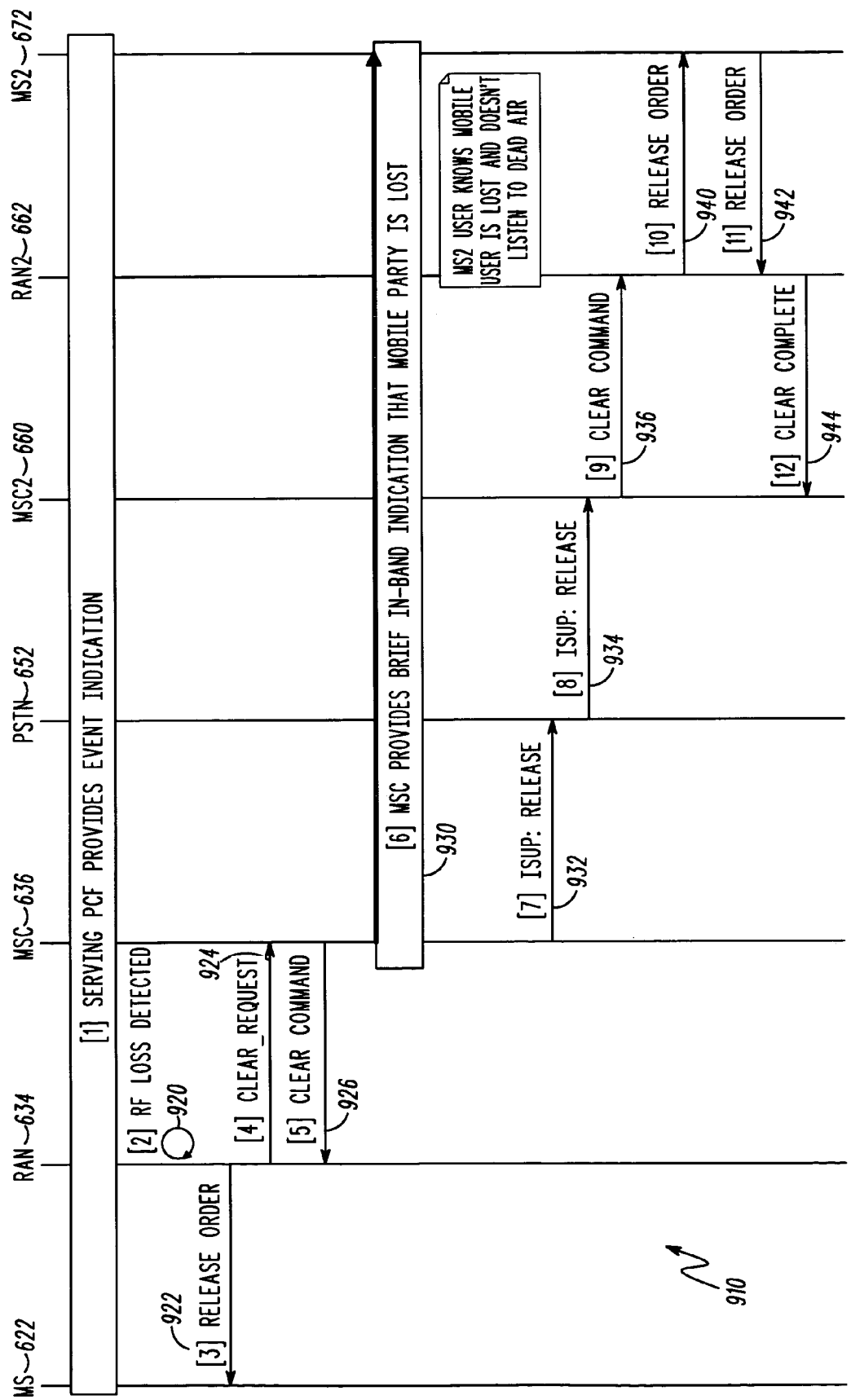
FIG. 9 depicts a simplified graphical representation of communication logic flow between components of a system, such as the system of FIG. 6, when providing voice communications over voice communication paths where a mobile switching center (MSC) provides the notification of a lost wireless link.

FIG. 9 depicts a simplified graphical representation of communication logic flow 910 between components of the system 610 when providing voice communications over voice communication paths where the serving or local PCF provides the notification of the lost user. In the process 910, the first MSC 636 generates and forwards the notification of the lost connection. At step 920, a first local RAN 634 detects a loss of the wireless link 612 between a BTS and a first MS 622. In step 922, the first local RAN issues a release command to the first MS. In step 924, the first RAN issues a clear request to the first local MSC 636. In step 926, the first MSC returns a clear command.

In step 930, the first local MSC 636 generates and injects a notification to a second remote MS 672 that the first MS was lost. At this point the second user knows that the first user is lost and does not have to wait any longer to determine if the first user is present or not.

The first MSC further issues an Integrated Services Digital Network (ISDN) user part protocol (ISUP) request in step 932 to release the communication channel to the PSTN 652. In step 934, the PSTN forwards the ISUP release request to the second remote MSC 660. The second MSC generates a clear command and forwards the clear command in step 936 to the second remote RAN 662. In step 940, the second RAN forwards a release order to the second MS 672 to release the wireless link 670. In step 942, the second MS returns a confirmation of the release order. In step 944, the second RAN forwards a clear complete notification to the second MSC.

In some embodiments, the process 910 can include additional, optional step 950 that occurs prior to step 942 and the confirmation of the release order. In step 950, the second MS forwards a communication to one or more servers (e.g., server 650) notifying the server that the first MS has lost connection. This allows the servers to release resources, and record transaction statistics (e.g., stop billing for communication time). When communicating over a voice path, it is often difficult for the RAN and/or MSC to notify the server of the lost link. However, the end points (i.e., the MSs) are generally aware or become aware of the lost connection. These end points are in the same communication group, they are exchanging communications with each other. As are result, the second MS can initiate the notification to the server without excess over head.

The optional step 950 may be beneficial in many situations. For example, when a group call is taking place, and the speaking user loses the voice path (RF loss), the server does not know the speaking user is gone. In step 940, one or more of the other communication devices (e.g., 672 and/or 626) participating in the conference call are notified that the speaking user has been lost from the voice path. Step 950 allows the one or more other communication devices to notify the server, allowing the server to release resources and/or open the control to the other users.

Figure 10:
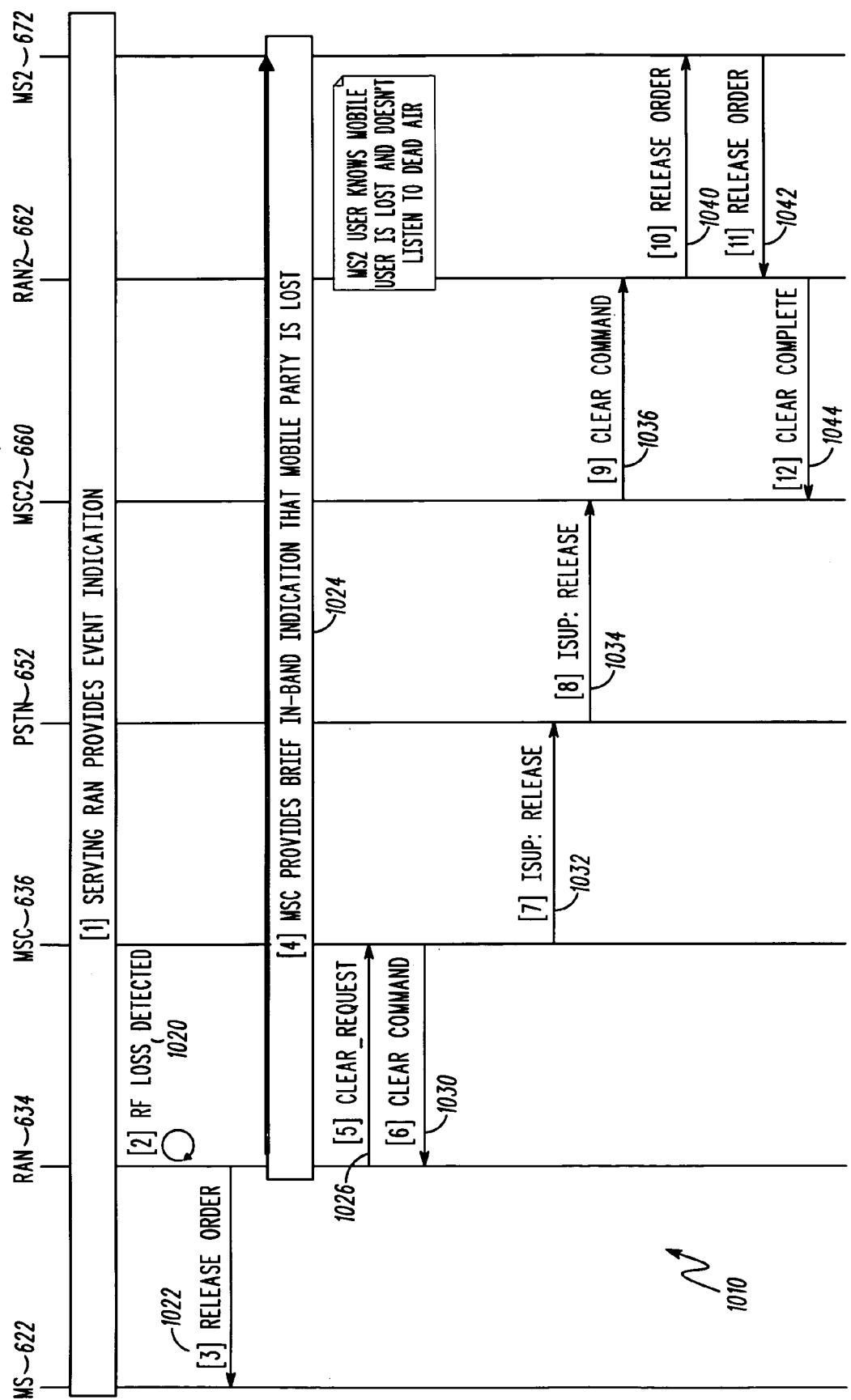
FIG. 10 depicts a simplified graphical representation of communication logic flow 1010 between components of a system, such as the system of FIG. 6, when providing voice communications over voice communication paths where a radio access network (RAN) provides the notification of a lost wireless link.

In some alternative embodiments, the local RAN 634 generates the notification to the one or more other parties participating in a communication with a first wireless device that loses the wireless link. FIG. 10 depicts a simplified graphical representation of communication logic flow 1010 between components of the system 610 when providing voice communications over voice communication paths where the serving or local RAN provides the notification of the lost user. In step 1020, the first local RAN detects the loss of the wireless link 612 with first MS 622. In step 1022, the first RAN issues a release order to the first MS. In step 1024, the first local RAN 634 generates a notification and forwards the notification to the second remote MS 672. At this point the second user is aware of the loss of the first MS and does not continue listening to dead air.

In step 1026, the first RAN issues a clear request to the first local MSC 636. In step 1030, the first MSC returns a clear command. In step 1032, the first local MSC 636 generates an ISUP request to release the communication channel to the PSTN 650. The PSTN forwards the ISUP release request in step 1034 to the second remote MSC 660. In step 1036, the second MSC forwards a clear command to the second remote RAN 662. In step 1040, the second RAN issues a release command to the second MS 672 to release the wireless link 670. In step 1042, the second MS returns a confirmation of the release order. In step 1044, the second RAN forwards a clear complete notification to the second MSC.

The embodiment of process 1010 avoids the delays associated with the generation of the clear request and clear commands between the first RAN and first MSC, steps 1026 and 1030, respectively. Therefore, in some implementations, the process 1010 can be implemented to further reduce the amount of time the second user might listen to the lost link.

The present embodiments advantageously improve the average user's experience and/or allows for increased network capacity. The notification to the users of lost connections reduces users' frustration levels, and improves user experience. Further, because of the reduced frustration levels, users are more likely to tolerate increased numbers of lost connections. As a result, some systems according to the present embodiments increase the system capacity while still maintaining user satisfaction levels. For example, in some implementations systems can carry ~1.1× more load when users tolerate about ~1% more lost connections (e.g., from 2% to 3% lost connections).

Additionally, because the system detects the lost connection, some embodiments terminate the use of system resources in reduce time. The releasing of system resources frees up these resources for other connections, allowing for an increase in system capacity.

Figure 11:
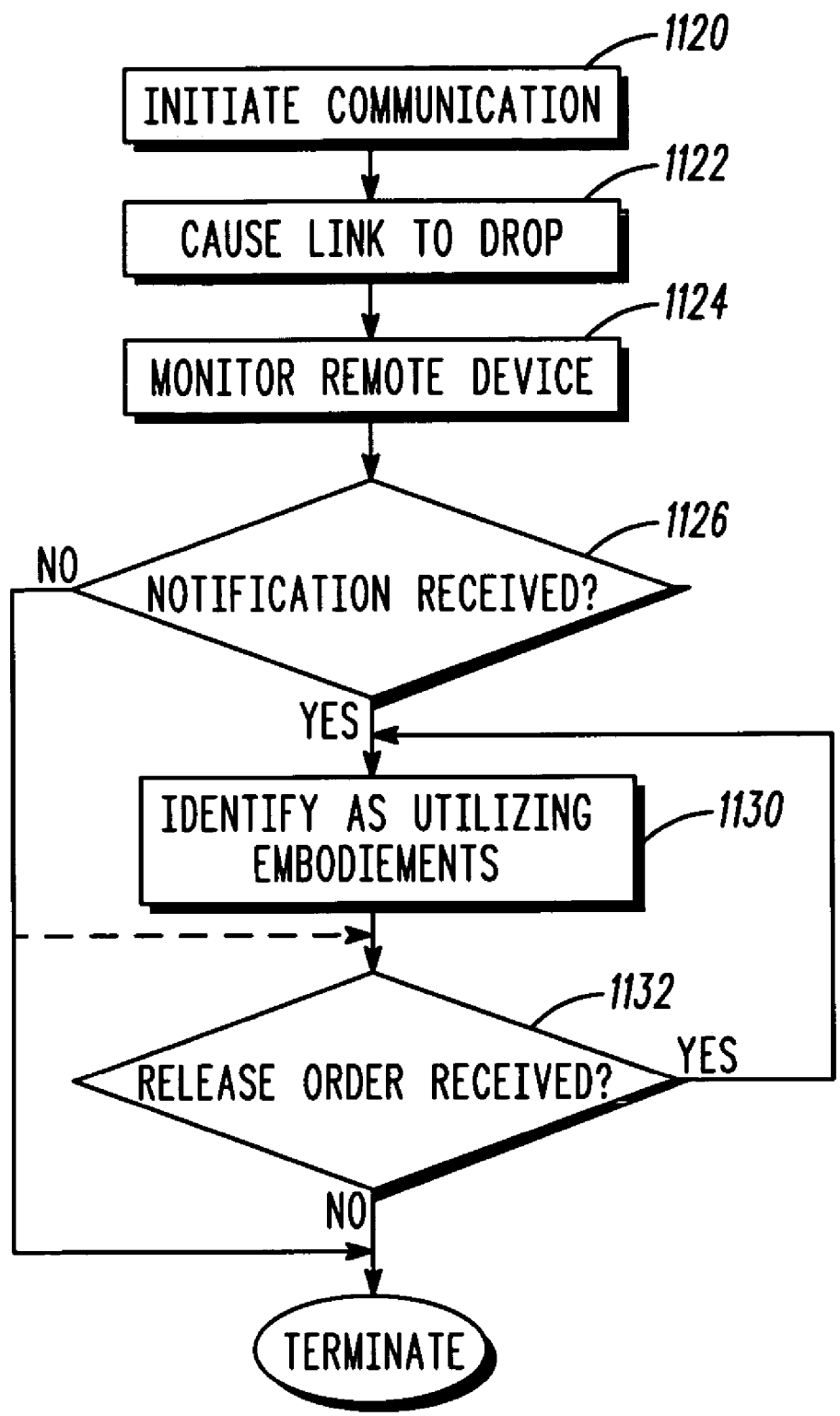
FIG. 11 depicts a simplified flow diagram of a process for use in determining whether a system or network is implementing the present embodiments to detect wireless link loss and to notify one or more other users of the loss.

FIG. 11 depicts a simplified flow diagram of a process 1110 for use in determining whether a system or network is implementing the present embodiments to detect wireless link loss and to notify one or more other users of the loss. In step 1120, a communication is initiated between a first wireless device and at least a second device (wireless or wired). The communication can be dispatch communication (e.g., PPT, voice-over-IP and other such dispatch communications) or a voice communication (e.g., cellular voice call). In step 1122, the process causes the wireless communication link with the first device to be lost. For example, the signal path can be obstructed, the wireless device can be moved into an RF loss, power to the wireless device can be disconnected (battery loss), and/or other such induced connection losses.

In step 1124, the commands and/or communications to the second communication device are monitored. In step 1126, it is determined if the second device receives a notification of loss. If the notification is not detected the process terminates. In some implementations, if the notification is not detected the process optionally proceeds to step 1132. If the notification is detected, step 1130 is entered where the process identifies the system as employing the present embodiments.

In some embodiments, optional step 1132 is included, where it is determined if the system generates a connection release order for the second communication device. If the release order is not received, the process terminates. If a release order is received, the process identifies the system as employing the present embodiments. In some embodiments, the detection of the connection release order is to be received within a predefined period for the process to indicate the system is employing the present embodiment.

In some embodiments, the process 1110 can further initiate a second communication between the first and second devices. The communication can then be terminated through normal termination from the first device (e.g., first device performs a normal hang-up). The process can then monitor the second communication device to determine if the termination is different and/or if the second device receives a notification.

In some present embodiments, a notification can additionally be forwarded to one or more users when another user loses a connection or purposely disconnects (e.g., hangs up). The notification when a user purposely disconnects can be a different notification than the notification forwarded when a lost connection is detected. For example, the notification of an intentional disconnect can be a different tone, a different voice message, different text message display, and/or other such notifications or combinations of notifications.

The increased capacity further allows system and/or communication service providers with potential increased revenue. Increasing the system capacity may result in increased lost connections. The potential lost billable minutes due to the early notification and release of resources provided by the present embodiments is minimal compared with the gains achieved through increased system capacity and/or user satisfaction that potentially results in increased customers. For example, if a system capacity providing batch communication (e.g., PTT communications) is increased by 25%, the increase in lost or dropped connections may be about 2%. The average length of time for a PTT transmission is about 5 seconds. As discussed above, the notification to the party not lost reduces user time on the system by about 3 seconds, resulting in a 3 second loss of billing time per lost connection. This 3 second lost billing equates to only about a 1% loss of revenue ((2%*~3)/5=~1%). Alternatively, the present embodiments allow for, in some implementations, a 25% increase in system capacity. Thus, the 25% increase in system capacity is much greater than the loss of about 1% billable minutes.

While the invention herein disclosed has been described by means of specific embodiments and applications thereof, numerous modifications and variations could be made thereto by those skilled in the art without departing from the scope of the invention set forth in the claims.

What is claimed is:

1. A method for use in notifying a user of a loss of a wireless connection, comprising:
   establishing a communication connection between a first communication device and a second communication device over a communication network, where the first communication device wirelessly communicates with the second communication device over at least a first wireless link;
   detecting a loss of the wireless link through a packet control function (PCF); and
   notifying the second communication device of the loss of the connection with the first communication device wherein the notifying comprises generating a notification from the PCF, and injecting the notification onto the communication connection directed to the second communication device.

2. The method of claim 1, wherein the notifying comprises generating and forwarding a real time protocol packet.

3. The method of claim 2 further comprising playing the received real time protocol packets to the user.

4. The method of claim 1, further comprising:
   determining whether the lost wireless link was purposely disconnected; and
   preventing the notifying the second communication device when the lost wireless link was purposely disconnected.

5. The method of claim 1, further comprising:
   the PCF notifying a server of the detected loss of the wireless link with the first communication device; and
   receiving an identification of the second communication device from the server such that the PCF accurately forwards the notification to the second communication device.

6. The method of claim 1, wherein the wherein the detecting comprises a radio access network (RAN) detecting the loss of the wireless link.

7. The method of claim 6, wherein the notifying comprises forwarding a notification prior to the RAN causing a release of the communication connection.

8. The method of claim 6, further comprising:
   the RAN notifying a first mobile switching center (MSC) of the loss of the wireless link; and
   the notifying comprises the first MSC injecting a notification onto the communication connection directed to the second communication device.

9. The method of claim 8, further comprising:
   notifying a second MSC to release the connection wit the second communication device following the injecting of the notification onto the communication connection.

10. A system for use in providing wireless communication comprising:
    a base station that wirelessly communicates with a first communication device over a wireless link;
    a radio access network (RAN) coupled with the base station;
    a second communication device communicationally coupled with the first communication device through at least the RAN;
    wherein the RAN detects a loss of the wireless link and generates a notification and forwards the notification to the second communication device notifying the second communication device that the wireless link has been lost.

11. The system of claim 10, wherein the RAN comprises a packet control function (PCF) that detects the loss of the wireless link.

12. The system of claim 11, further comprising:
    a packet data serving node (PDSN) coupled with the RAN and further coupled with a distributed network, such that the second communication device is communicationally coupled with the first communication device through at least the RAN, PDSN and the distributed network.

13. The system of claim 10, further comprising:
    a server communicationally coupled with the RAN such that the PAN queries the server to identify the second communication device prior to forwarding the notification.

* * * * *